V. E. RANDALL.
MANUFACTURE OF CEMENT BURIAL CASES.
APPLICATION FILED MAR. 30, 1914.
1,144,970.
Patented June 29, 1915.
2 SHEETS—SHEET 2.
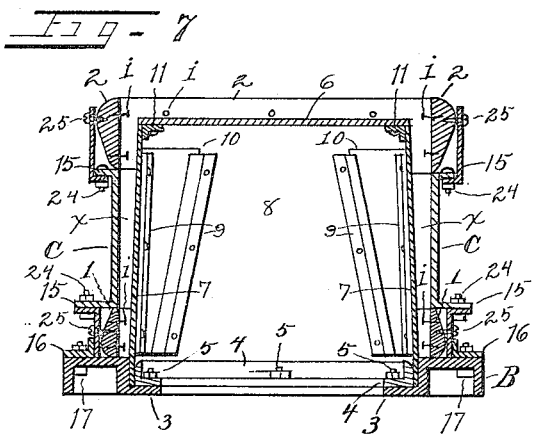
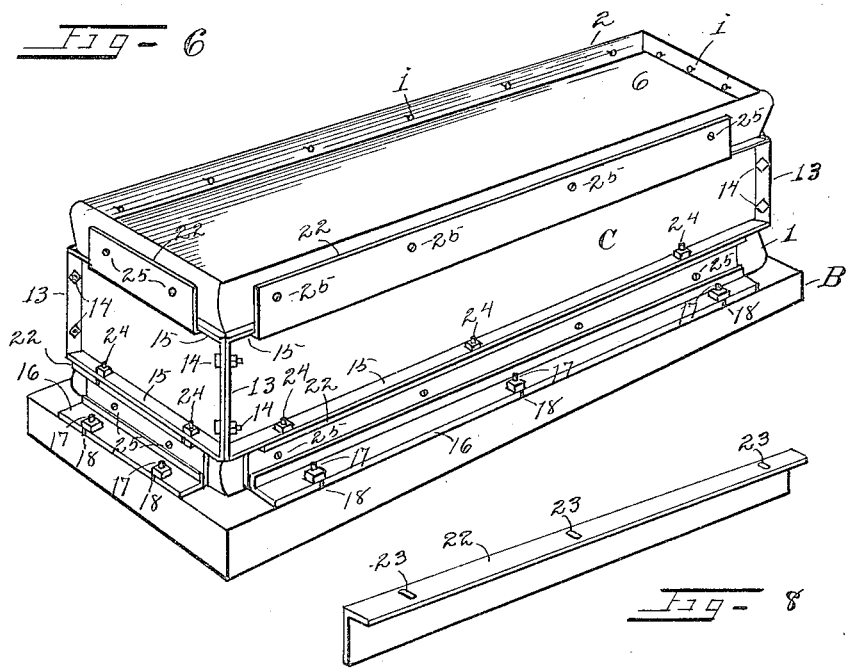
WITNESSES.
R C Ruggles
E J Johnson
INVENTOR.
Victor E. Randall.

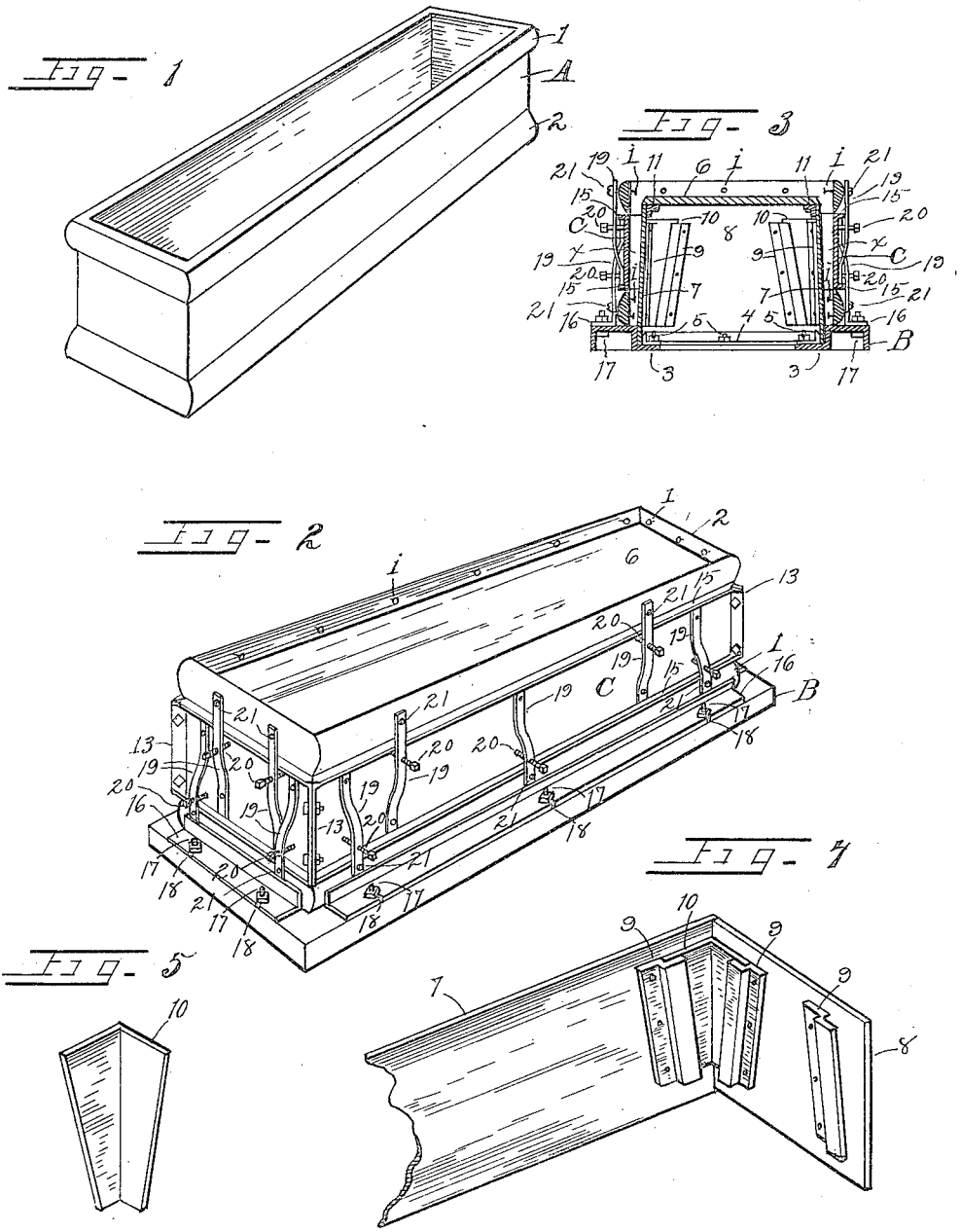

UNITED STATES PATENT OFFICE.

VICTOR E. RANDALL, OF BATTLE CREEK, MICHIGAN, ASSIGNOR OF ONE-HALF TO HOWARD E. RUSSELL, OF BATTLE CREEK, MICHIGAN.

MANUFACTURE OF CEMENT BURIAL-CASES.

1,144,970.   Specification of Letters Patent.   Patented June 29, 1915.

Application filed March 30, 1914.   Serial No. 828,166.

*To all whom it may concern:*

Be it known that I, VICTOR E. RANDALL, a citizen of the United States, residing at Battle Creek, in the county of Calhoun and State of Michigan, have invented certain new and useful Improvements in the Manufacture of Cement Burial-Cases, of which the following is a specification.

In the manufacture of cement burial cases it has been customary to either form the cases with ornamental moldings of cement integral therewith at the time of forming the case, or to attach wooden or other moldings to the case after having been made.

The present invention has for its principal object to obviate the difficulty of attaching the ornamental moldings to the case after having been made, by previously assembling the border strips or moldings to the requisite shape, and in combination with a supplemental mold provide an exterior container or mold section to be used in conjunction with a spaced inner mold section between the walls of which plastic composition may be run to produce the finished case, which when removed, will have the ornamental moldings automatically and integrally formed therewith. It is estimated in producing a burial case in this manner that a saving of 25% can be made in the manufacture of this class of merchandise, besides affording a case in which the moldings are perfectly and solidly attached.

In the drawings forming a part of this specification:—Figure 1, represents a burial case molded in conformity with my invention. Fig. 2, is one embodiment of a mold in readiness to be run of plastic cement composition to form a burial case. Fig. 3, is a cross section of Fig. 2. Fig. 4, is a view in detail of a portion of the inner molded wall. Fig. 5, is a locking wedge for securing the inner mold walls intact. Fig. 6, is another embodiment of my improved mold. Fig. 7, is a cross section of the same. Fig. 8, is a perspective view of one of the molding guide wings.

Like marks of reference refer to corresponding parts throughout the different views in which, "A," represents a burial case as it appears when removed from the mold with its ornamental border moldings "1" and "2" formed integral therewith.

"B," is a base or pallet upon which the burial case is formed. This base in general outline corresponds in shape to the case to be molded or formed thereon, and it may be composed of metal or wood or both. As herein shown it represents an inverted open parallelogram, having an internally extending flange, "3." This flange carries an adjustable angle-plate "4," secured to said flange by bolts, "5", and fitted between the upturned edge of said plate and the base, or pallet "B", the depending edges of the inner mold form is received. This mold form comprises five sections, a top "6", two longitudinal sides "7, 7," and two ends "8", one of which only is shown in the drawings. The parts aforesaid by preference are all detachable one from another and in many respects are not unlike similar apparatus for a like purpose. That the ends and sides to this part of the mold may be easily and securely assembled and as readily taken down, I provide a locking means for securing the same intact. At either end of both end and side pieces from their inner sides, flange plates "9", are riveted. These plates angle downwardly toward the corner of the assembled parts and between the flanged angles of these plates a tapering winged wedge "10", is fitted. The top "6" may be kept from dislodgment by means of checking stops "11", or equivalent means riveted or otherwise secured thereto. These stops also prevent the sides of the inner mold section from collapsing when the mold chamber "$x$" is run with cement composition. Customarily in running burial cases of cement composition a reinforcing framework of metal is employed which when used is first placed within the mold chamber before filling in the cement.

In assembling a mold to run a burial case, the ornamental rim and base moldings "1" and "2", respectively are first formed in the requisite shape, much in the same manner of securing the corners of picture frames. The moldings after having been formed up, if of wood or similar material, being first supplied with screws or brads "$i$", which project from their inner surface into the mold chamber "$x$" for the purpose of forming anchors to prevent the moldings from cleaving from the superstructure when set or hardened. Where moldings are made of sheet metal, lips are struck up from the metal, or other equivalent means for the purpose may be provided. The moldings having been thus fitted the rim molding "1" is placed narrow edge uppermost on the base or pallet "B", then placing on top of this molding the supplemental outer forming mold section "C", and on this section set the base molding "2", with its narrow edge against the mold section.

The assemblage of parts in the order given, forming an outer casing or container within which together with the inner spaced mold section, above set forth, forms the chamber within which the cement composition is to be run to form the completed burial case. When a mold thus formed is set up for running with cement, the base molding 2 is uppermost and extends above bottom section 6, of the inner mold section the thickness of the bottom of the burial case to be made, it being understood that the mold is filled with cement, inverse to the working burial case when completed. The mold section "C" preferably is of sectional construction, and may consist of two or more parts. In forming a rectangular shaped case, a preferred method is to divide the mold on the corners as shown, and secure the outwardly flanged corners "13" by means of bolts "14", although latches or other means would answer well for the purpose, the bolts being removed to disassemble the mold when it is desired to remove a molded case therefrom.

In Figs. 2. and 6. the mold section "C" has flanged edges "15", in the former instance they are provided principally to stiffen the sections and in the latter instance to both stiffen the sections and to afford means to attach molding guides, hereinafter set forth.

That the molding "1", when in position on the base or pallet "B" may be properly held in position, a series of surrounding flanged plates "16" are fitted by bolts "17" to said base. These plates are made adjustable either by providing elongated bolt holes in said base or by providing slots "18" in said plates, as shown, or both, as may be expedient. For the purpose of keeping both the mold "B" and the moldings "1" and "2" in proper alinement I provide a series of spring fingers "19" rigidly attached at one end to the section "C", and extend their opposite ends over the moldings, and that the fingers may be adjustably fitted to correspond with the varying thickness of moldings employed, I provide a threaded hole through each finger near the free end and fit a set-screw "20" therein with its end bearing against the mold. By turning a set-screw as set forth, a finger may be raised or lowered as expedient to fit the molding, and to further facilitate the holding of the parts intact, small screws "21" are passed through the free ends of the fingers and into the moldings, if of wood.

Another object in attaching the fingers to the moldings as aforesaid, is to prevent the moldings from working and to aline the same if out of alinement.

In Fig. 6. is shown another embodiment of my invention in which I employ a series of flanged wings, or molding guides, "22" instead of the fingers "19", of Fig. 2., for holding the moldings in position. These guides, by preference have a series of elongated holes or slots "23" through their shorter angles which register with holes in the flanges "15", of the section "C" and through which small bolts "24" are fitted to hold the parts in operative position. The slots in the flanges are for the purpose of permitting the guides to be adjustably fitted to the varying thickness of moldings used in forming a burial case. In attaching the guides, the long flanges are best suited to bear against the moldings as shown and where wooden moldings are employed I prefer to provide a series of holes through said flanges in alinement with the moldings and through these holes fit screws "21", to keep the moldings in perfect alinement and position.

It is best suited to the purpose to arrange and hold the moldings "1" and "2", so that the edges of the working surfaces will be in alinement with the mold section "C", to the end that when cement is run within the mold chamber the finished case thus formed will have a comparatively uniform or graduated uniform thickness in its side walls. Where wood is employed a preferred method is to treat the same with creosote or other filler or preservative to prevent the same from warping, inasmuch as the superstructure of cement will contain more or less moisture during the running, setting up and curing process, which would have a tendency to warp the wooden moldings attached thereto, were the same not especially treated for the purpose.

In the method of applying wooden or other moldings to a burial case as set forth, the case can be molded with comparatively thin walls and yet be rendered very firm and rigid, yet comparatively light, the moldings also forming means to prevent fracture of the case or cover should the same be accidentally dropped or collide with other objects.

From the foregoing description a more extended explanation of the objects and advantages of my invention it is believed will not be necessary.

Having therefor set forth the objects and advantages of my invention, what I claim as new and desire to secure by Letters Patent is:—

1. In a mold, the combination of a base, an inner mold section seated upon said base, a spaced encompassing outer mold section, means secured thereto adapted to hold ornamental rim and base members with their inner faces flush with the inner surface of said outer mold section while the case is being formed, for the purpose described.

2. In a mold, the combination of a base and inner mold section seated upon said base, a spaced encompassing outer separable open-topped mold section, spring fingers secured thereto adapted to hold ornamental base and rim members with their inner faces flush with the inner surface of said outer separable open-topped mold section, while the case is being formed, said base member extending above said inner mold section.

3. In a mold, the combination of a base and an inner mold section seated upon said base, a separable spaced encompassing outer mold section, spring fingers secured thereto adapted to hold ornamental base and rim-members with their inner faces flush with the inner surface of said outer mold section while the case is being formed, said rim-member adapted to rest on said base and said base-member adapted to extend above said inner mold section, substantially as and for the purpose set forth.

4. In a mold, the combination with a base and an inner mold section seated upon said base, of a separable spaced encompassing outer mold section, fingers extending from the outer side of said outer mold section beyond either edge thereof adapted to hold ornamental base and rim-members with their inner faces flush with the inner surface of said outer mold section while the case is being run, set screws passing through threaded apertures in said fingers and bearing against said outer mold section to laterally adjust the extremities of said fingers.

5. In a mold, the combination with a base and an inner mold section seated upon said base, of a separable spaced encompassing outer mold section, fingers secured thereto adapted to engage ornamental base and rim-members with their inner faces flush with the inner surface of said outer mold section at either edge thereof while the case is being formed, and means to laterally vary the outer extremities of said fingers, for the purpose set forth.

6. In a mold, the combination with a base and an inner mold section seated upon said base, of a separable spaced encompassing outer mold section, flexible fingers secured thereto adapted to engage ornamental base and rim-members with their inner faces flush with the inner surface of said outer mold section at either edge thereof while the case is being formed, means to laterally vary the outer extremities of said fingers with respect to said outer mold section and means to attach said base and rim-members at the extremities of said fingers, as and for the purpose set forth.

7. In a mold, the combination with a base and an inner mold section seated upon said base, of a separable spaced encompassing outer mold section, means attached to said outer mold section adapted to hold ornamental base and rim-members at either edge thereof with their inner faces flush with the inner surface of said outer mold section while the case is being formed, and means to adjustably hold said outer mold section and said rim and base-members in operative position with said inner mold section.

VICTOR E. RANDALL.

Witnesses:
ROBT. G. ROE,
E. R. MORTON.

Copies of this patent may be obtained for five cents each, by addressing the "Commissioner of Patents, Washington, D. C."